(12) United States Patent
Yanagisawa (10) Patent No.: US 9,729,766 B2
(45) Date of Patent: Aug. 8, 2017

(54) HINGE STRUCTURE, SUPPORT STRUCTURE AND ELECTRIC APPARATUS

(71) Applicant: RICOH IMAGING COMPANY, LTD., Tokyo (JP)

(72) Inventor: Kimiharu Yanagisawa, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 182 days.

(21) Appl. No.: 14/706,281

(22) Filed: May 7, 2015

(65) Prior Publication Data

US 2015/0334273 A1    Nov. 19, 2015

(30) Foreign Application Priority Data

May 19, 2014 (JP) .................................. 2014-103262
May 19, 2014 (JP) .................................. 2014-103541

(51) Int. Cl.

| | | |
|---|---|---|
| *H04N 5/225* | (2006.01) | |
| *E05D 11/08* | (2006.01) | |
| *E05D 5/14* | (2006.01) | |
| *E05D 7/10* | (2006.01) | |
| *H04N 5/232* | (2006.01) | |
| *G03B 17/04* | (2006.01) | |

(52) U.S. Cl.
CPC ............ *H04N 5/2251* (2013.01); *E05D 5/14* (2013.01); *E05D 7/10* (2013.01); *E05D 11/08* (2013.01); *E05D 11/082* (2013.01); *G03B 17/04* (2013.01); *H04N 5/225* (2013.01); *H04N 5/2252* (2013.01); *H04N 5/23293* (2013.01); *Y10T 16/528* (2015.01); *Y10T 16/5402* (2015.01); *Y10T 16/54038* (2015.01); *Y10T 16/553* (2015.01); *Y10T 16/554* (2015.01); *Y10T 16/558* (2015.01)

(58) Field of Classification Search
CPC ............... H04N 5/2251; H04N 5/2252; H04N 5/23293; H04N 5/225; G03B 17/04; E05D 7/10; E05D 11/08; E05D 5/14; E05D 11/082; Y10T 16/528; Y10T 16/54038; Y10T 16/553; Y10T 16/554; Y10T 16/558; Y10T 16/05
See application file for complete search history.

(56) References Cited

U.S. PATENT DOCUMENTS

| | | | |
|---|---|---|---|
| 7,046,287 B2 * | 5/2006 | Nishino | H04M 1/0216 348/333.06 |
| 7,088,494 B2 | 8/2006 | Mizuno | |
| 7,178,200 B2 | 2/2007 | Kosako et al. | |
| 7,706,673 B1 * | 4/2010 | Staudinger | F16M 11/2021 348/211.2 |
| 8,692,921 B2 * | 4/2014 | Nakagawa | G03B 13/04 348/333.06 |
| 8,811,813 B2 * | 8/2014 | Takahashi | H04N 5/2252 348/333.06 |

(Continued)

FOREIGN PATENT DOCUMENTS

| | | |
|---|---|---|
| JP | 08-023465 | 1/1996 |
| JP | 2003-301654 | 10/2003 |

*Primary Examiner* — Roberto Velez
*Assistant Examiner* — Tuan Le
(74) *Attorney, Agent, or Firm* — Greenblum & Bernstein, P.L.C.

(57) ABSTRACT

A hinge structure, comprising a plurality of bearings each of which has a cylindrical body formed by using a molding die, and a shaft member rotatably supported by the plurality of bearings.

9 Claims, 7 Drawing Sheets

(56) References Cited

U.S. PATENT DOCUMENTS

| | | | |
|---|---|---|---|
| 9,388,617 B2 * | 7/2016 | Onda .................... | E05D 11/082 |
| 9,413,971 B2 * | 8/2016 | Mitsui .................. | H05K 5/0017 |
| 2009/0019668 A1 * | 1/2009 | Cheon ................. | H04M 1/0216 |
| | | | 16/297 |
| 2010/0064536 A1 * | 3/2010 | Caskey ................ | G06F 1/1616 |
| | | | 33/303 |
| 2013/0176412 A1 * | 7/2013 | Chen ..................... | H04N 7/183 |
| | | | 348/77 |

* cited by examiner

HINGE STRUCTURE, SUPPORT STRUCTURE AND ELECTRIC APPARATUS

BACKGROUND OF THE INVENTION

The present invention relates to a hinge structure for rotatably support a body to be supported, a foldable support structure for supporting the body to be supported and an electric apparatus having the foldable support structure.

In general, a digital camera is provided with a display device, such as an LCD (Liquid Crystal Display). Japanese Patent Provisional Publication No. 2003-301654A (hereafter, referred to as patent document 1) describes a digital camera of this type in which a display device is attached to a camera body via a hinge structure having a frictional braking function so that the angle of the display device with respect to the camera body can be adjusted. Such a configuration allows a photographer to capture an image at various angles while checking the image displayed on the display device.

Japanese Patent Provisional Publication No. HEI 8-23465A (hereafter, referred to as patent document 2) describes a digital camera in which a display device is attached to a camera body via a support stricture constituting a link mechanism so that the display device can be tilted both in the up and down direction and in the left and right direction. The support structure uses a frictional hinge structure configured such that, by applying frictional resistance to rotations of movable units, the movable units do not rotate unless torque of a predetermined strength or more is applied to the movable units. With this configuration, the display device can be held in a stationary state at an arbitrary position and posture within a movable range.

SUMMARY OF THE INVENTION

The hinge structure described in patent document 1 includes a cylindrical body made of resin having a non-circular lateral cross section, a metal shaft member inserted into the cylindrical body, and a friction member disposed between an inner circumferential surface of the cylindrical body and the metal shaft member. In this configuration, the friction member is formed by folding a metal plate in a shape of a polygonal prism.

In the above described structure of patent document 1, the frictional resistance applied to rotations of the metal shaft member changes largely depending on slight difference of the size of the lateral cross section of the inner circumferential surface of the cylindrical body. In addition, in order to from a cylindrical body made of resin by injection molding, it is necessary to form the inner circumferential surface of the cylindrical body as a tapered surface, by which the inner diameter of the cylindrical body becomes narrower in an extending direction of the inner circumferential surface of the cylindrical body, so that the cylindrical body can be removed from the molding die. For this reason, the frictional resistance does not become uniform in the extending direction of the cylindrical body, and frictional resistance produced at an end of the cylindrical body where the inner diameter of the cylindrical body is small becomes dominant. As a result, variation of the entire frictional resistance of the hinge structure becomes large due to variation of the size at one end of the cylindrical body where the inner diameter of the cylindrical body is small, which requires troublesome work for adjusting the frictional resistance, for example, by deforming the frictional member.

In the support structure described patent document 2, the strength of the frictional resistance of the frictional hinge structure is set to a value close to the lower limit in a range required to stably maintain the position of the display device being used so that the display device can be operated by a force as weak as possible. Therefore, the rotation resistance of the frictional hinge structure alone may not be enough to prevent the display device from moving if a force, such as vibration, which is slightly stronger than the rotation resistance is applied to the display device, for example, during conveyance. This may cause damage to the display device. For this reason, the support structure is provided with a locking mechanism formed of a locking nail and a hook so that the folded state of the support structure can be maintained during conveyance.

However, the locking mechanism formed of the locking nail and the hook described in patent document 2 requires providing complicated engagement structures to a plurality of components. Therefore, a large degree of individual difference of the locking condition or the releasing condition is caused due to variation in finished dimension of components or in assembling accuracy, which causes unstable locking quality.

The present invention is advantageous in that it provides at least one of a hinge structure, a support structure and an electric apparatus capable of providing stable supporting quality.

According to an aspect of the invention, there is provided a hinge structure, comprising: a plurality of bearings each of which has a cylindrical body formed by using a molding die; and a shaft member rotatably supported by the plurality of bearings.

With this configuration, variation of the frictional resistance can be reduced and thereby it becomes possible to provide a stable support quality.

In at least one aspect, the hinge structure may further comprise a bearing holding part that holds the plurality of bearings in such a manner that the plurality of bearings are held coaxially.

In at least one aspect, the bearing holding part may be formed in a cylindrical shape having a hollow part whose lateral cress section has a non-circular shape. The cylindrical body may have an outer circumferential surface whose lateral cross section has a non-circular shape corresponding to the non-circular shape of the hollow part of the bearing holding part. The cylindrical body may be held in a state of being unable to rotate by inserted into the hollow part of the bearing holding part.

In at least one aspect, the hollow part of the bearing holding part may have a shape of a polygonal prism. The outer circumferential surface of the cylindrical body may have a shape substantially equal to a shape of an inner circumferential surface of the bearing holding part.

In at least one aspect, the hinge structure may further comprise a friction member disposed between the shaft member and an inner surface of the cylindrical body. In this case, the friction member may apply a frictional force to rotations of the shaft member by contacting the shaft member.

In at least one aspect, the inner surface of the cylindrical body may be formed in a shape of a polygonal prism. The friction member may be a leaf spring formed by folding a metal plate such that the friction member has a shape of a polygonal prism corresponding to the inner surface of the cylindrical body and that the friction member is held in a state of unable to rotate in a hollow part of the cylindrical body.

In at least one aspect, each side surface of the friction member formed in the shape of the polygonal prism may be curved to protrude inward. A diameter of an inscribing circle in a lateral cross section of the friction member may be smaller than an outer diameter of the shaft member.

In at least one aspect, the bearing holding part may be made of material which is more rigid than the cylindrical body.

In at least one aspect, the bearing holding part may be made of metal, and the cylindrical body may be made of resin.

In at least one aspect, the hinge structure may further comprise a movable unit configured to be able to rotate with respect to the bearing holding part and to comprise a shaft member support unit. The shaft member support unit may comprise: a first arm having a tip part in which a first boss hole into which an end of the shaft member is inserted is formed; and a second arm having a tip part in which a second boss hole into which an other end of the shaft member is inserted is formed. In this configuration, a lateral cross section of at least one of the one end and the other end of the shaft member may be formed in a non-circular shape. One of the first boss hole and the second boss hole into which the at least one of the one end and the other end of the shaft member is inserted may be formed in a non-circular shape corresponding to the lateral cross section of the at least one of the one end and the other end of the shaft member.

In at least one aspect, one of the bearing holding part and the movable unit may be connected to a body of a digital camera. The other of the bearing holding part and the movable unit may be connected to a display of the digital camera.

According to another aspect of the invention, there is provided a support structure supporting a body to be supported, comprising: a base unit; a first movable unit rotatably connected to the base unit; a first hinge unit configured to rotatably connect the base unit and the first movable unit; a second movable unit rotatably connected to the first movable unit, the body to be supported being attached to the second movable unit; a second hinge unit rotatably connecting the first movable unit and the second movable unit, a rotation axis of the second hinge unit being in parallel with a rotation axis of the first hinge unit; and a fixing unit configured to fix integrally the base unit, the first movable unit and the second movable unit when the base unit, the first movable unit and the second movable unit are folded and stacked on top of one another, and to release a fixed state of the base unit, the first movable unit and the second movable unit when a force having a predetermined strength or more is applied to the base unit, the first movable unit and the second movable unit in a direction of pulling the base unit, the first movable unit and the second movable unit apart.

With this configuration, a support structure whose locking function has stable quality can be provided.

In at least one aspect, the fixing unit may integrally fixed the base unit, the first movable unit and the second movable unit at a central position between the rotation axis of the first hinge unit and the rotation axis of the second hinge unit.

In at least one aspect, the fixing unit may comprise a magnet attached to at least one of the base unit, the first movable unit and the second movable unit.

In at least one aspect, the magnet may be attached to one of the base unit and the second movable unit to protrude toward the other of the base unit and the second movable unit. The first movable unit may be formed to have one of a hole and a recession in which a projected part of the magnet is stored.

In at least one aspect, the second movable unit may comprise a first operation member operated to open the second hinge unit. The first operation member may be disposed on a first hinge unit side with respect to a fixed position by the fixing unit.

In at least one aspect, the support structure may further comprise a second operation member operated to open the first hinge unit. The second operation member may be provided on one of the first movable unit and the second movable unit and may be disposed on a second hinge unit side with respect to the fixed position by the fixing unit.

In at least one aspect, the base unit may comprise a guard part configured to cover both end portions of each of the first movable unit and the second movable unit in a rotation axis direction, at a central position between the rotation axis of the first movable unit and the rotation axis of the second movable unit, so as to prevent a user's finger from touching the both end portions of each of the first movable unit and the second movable unit in a state where the base unit, the first movable unit and the second movable unit are folded and stacked on top of one another.

In at least one aspect, the first hinge unit may comprise: a first shaft member fixed to the first movable unit; a bearing fixed to the base unit, the bearing rotatably supporting the first shaft member; and a friction member fixed to the base unit, the friction member applying frictional resistance to rotations of the first shaft member. The friction member may be a leaf spring member comprising: first and second fixing parts fixed to the base unit; and a friction part formed in a V-shape to connect the first and second fixing parts and to sandwich the first shaft member between the friction part and the base unit. In this case, the first shaft member may contact with and be pressed by the base unit and two surfaces forming the V-shape of the friction part, and thereby the frictional resistance is applied to the rotations of the first shaft member.

In at least one aspect, the support structure may further comprise an underlay member that is disposed between the base unit and the first shaft member and is fixed to the base unit, so as to prevent the base unit and the first shaft member from contacting each other. The base unit and the first shaft member may be made of different types of metal. The first shaft member and the underlay member may be made of a same type of metal.

In at least one aspect, one of the first hinge unit and the second hinge unit may comprise: a plurality of bearings each of which has a cylindrical body formed by using a molding die; and a shaft member rotatably supported by the plurality of bearings.

According to another aspect of the invention, there is provided an electric apparatus, comprising: a main body; a display connected to the main body; and one of the above described the support structures. The support structure movably supports the display with respect to the main body. In this configuration, the base unit of the support structure is attached to the main body. The display is attached to the second movable unit of the support structure. The second movable unit of the support structure comprises an indicator disposed in a peripheral portion of a screen of the display.

With this configuration, an electric apparatus having a support structure whose locking function has stable quality can be provided.

In at least one aspect, the electric apparatus may further comprise a driving device configured to drive a removable storage medium. The indicator may be an access lamp displaying a status of accessing to the removal storage medium by the driving device and is disposed on the second movable unit at a position near the driving device.

In at least one aspect, the electric apparatus may be a digital camera.

DETAILED DESCRIPTION OF THE EMBODIMENTS

Hereinafter, an embodiment according to the invention is described with reference to the accompanying drawings.

Figure 1:
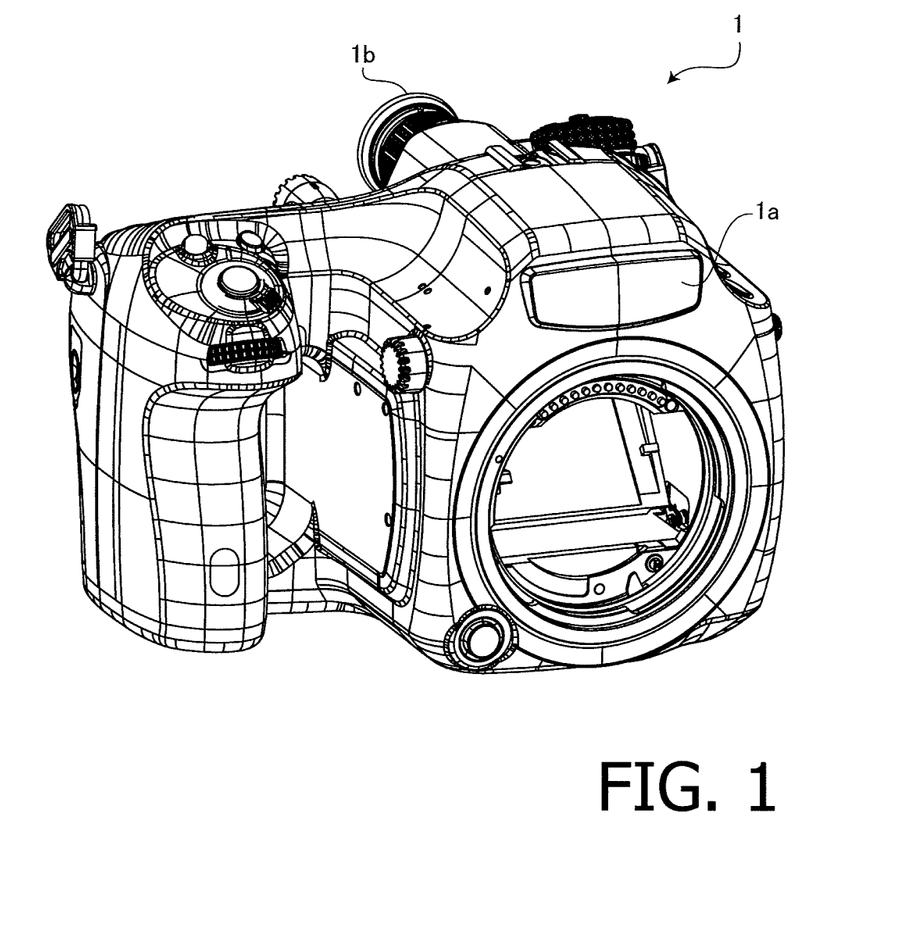
FIG. 1 is an outside drawing of a digital still camera provided with a hinge structure (a second hinge unit) according to an embodiment of the invention.

FIG. 1 is an outside drawing of a digital still camera 1 (hereafter, simply referred to as a camera 1) provided with a hinge structure (a second hinge unit 500) and a support structure (a tilt structure 10) according to the embodiment of the invention.

Figure 2:
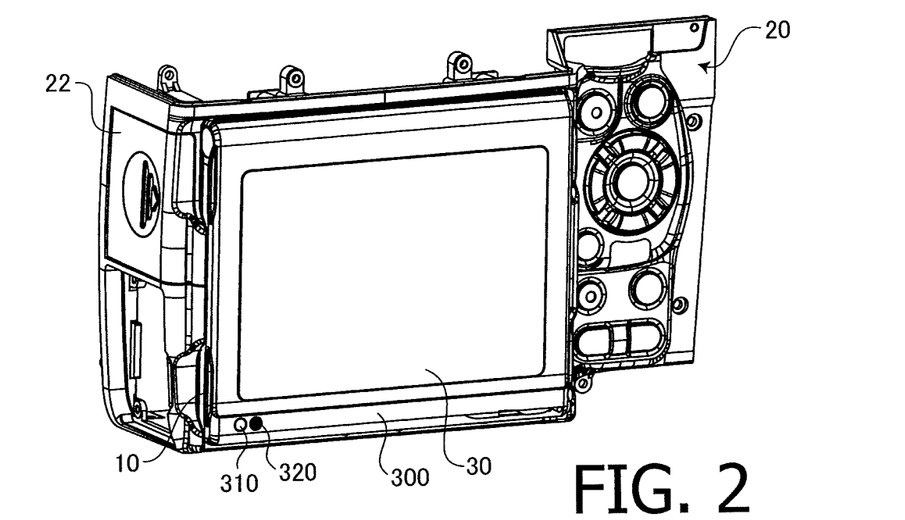
FIG. 2 is an outside drawing of an exterior cover to which a display is attached via a tilt structure.
Figure 3:
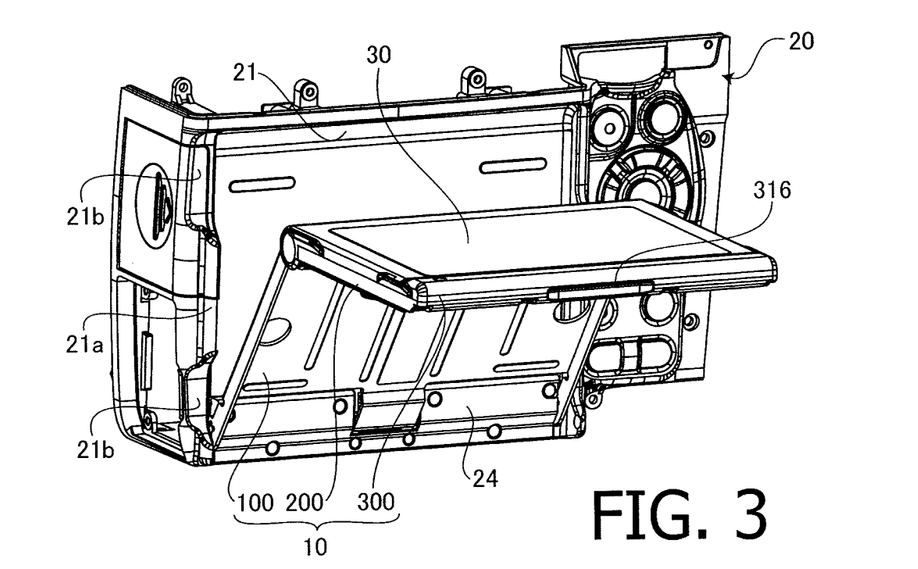
FIG. 3 is an outside drawing of an exterior cover to which a display is attached via the tilt structure.

Each of FIGS. 2 and 3 is an outside drawing of a back side exterior cover 20 (hereafter, simply referred to as an exterior cover 20) of the camera 1 to which a display 30 (e.g., an LCD (Liquid Crystal Display) or an organic EL (Electro-Luminescence) display) is attached via the tilt structure 10. FIG. 2 illustrates a retracted state where the tilt structure 10 is closed and the display 30 and the tilt structure 10 are retracted into a display storing recessed part 21 formed on the exterior cover 20 (a base unit). FIG. 3 illustrates a tilted state where the tilt structure 10 is expanded and the display 30 is tilted.

In the following explanation, the left and right direction in FIG. 2 (the lateral direction on a screen of the display 30) is defined as the left and right direction or the lateral direction, the up and down direction in FIG. 2 (the vertical direction on the screen of the display 30) is defined as the up and down direction or the vertical direction. Further, the subject side with reference to the camera 1 (the back side of the paper face of FIG. 2) is defined as the front side, and the display 30 side with respect to the camera 1 (the front side of the paper face of FIG. 2) is defined as the rear side.

Figure 4:
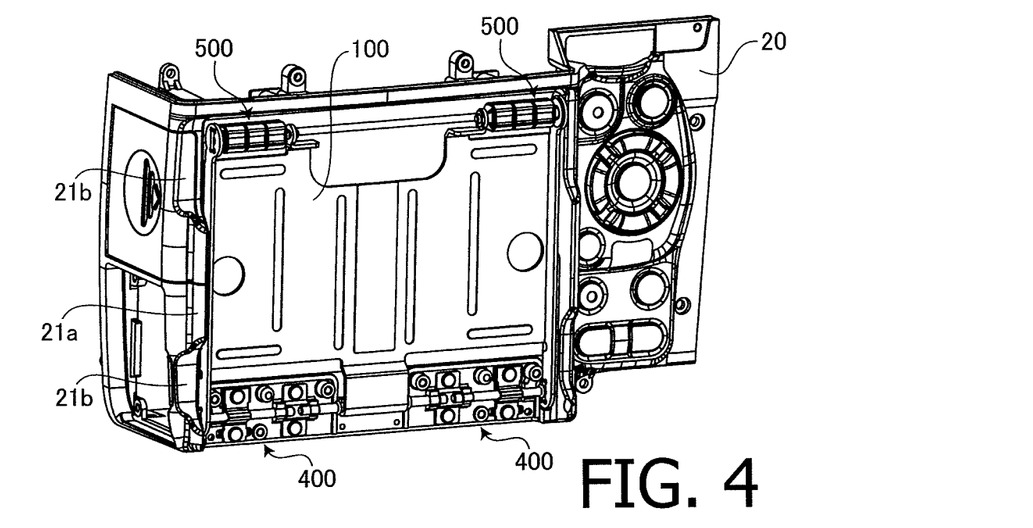
FIG. 4 illustrates a state where a second movable unit, the display and a protective cover are removed from the exterior cover shown in FIG. 2.

The tilt structure 10 is a support structure to movably support the display 30 being a body to be supported with respect to a camera body 1a. The tilt structure 10 includes a first movable frame 100, a second movable frame 200 and a cover 300, which are shown in FIG. 3, and first hinge units 400 and second hinge units 500 which are shown in FIG. 4. The first hinge unit 400 and the second hinge unit 500 are described later. It should be noted that FIG. 4 illustrates a state where the second movable frame 200, the cover 300, the display 30 and a pair of protective covers 24 are removed from the state illustrated in FIG. 2.

A frame of the exterior cover 20 is made of magnesium alloy being paramagnetic material. A lower edge part of the first movable frame 100 is rotatably connected to a lower edge part of a back side of the camera body 1a (the exterior cover 20) by the pair of first hinge units 400 having a rotation axis extending in the left and right direction of the camera 1. An upper edge part of the second movable frame 200 is movably connected to an upper edge part of the first movable frame 100 by the pair of second hinge units 500 having a rotation axis extending in the left and right direction of the camera 1. That is, a sort of a link mechanism is constituted by the first hinge units 400, the first movable frame 100, the second hinge units 500 and the second movable frame 200. The display 30 is fixed to the second movable frame 200. With this configuration, an angle in the up and down direction of the display 30 with respect to the camera body 1a (i.e., an elevation/depression angle of a normal line to a screen of the display 30) and a distance from the display 30 to the camera body 1a can be adjusted within a predetermined range. Therefore, a photographer is able to perform low angle capturing or high angle capturing in a moderate posture while looking at a live view (a real time video) displayed on the display 30.

Figure 5:
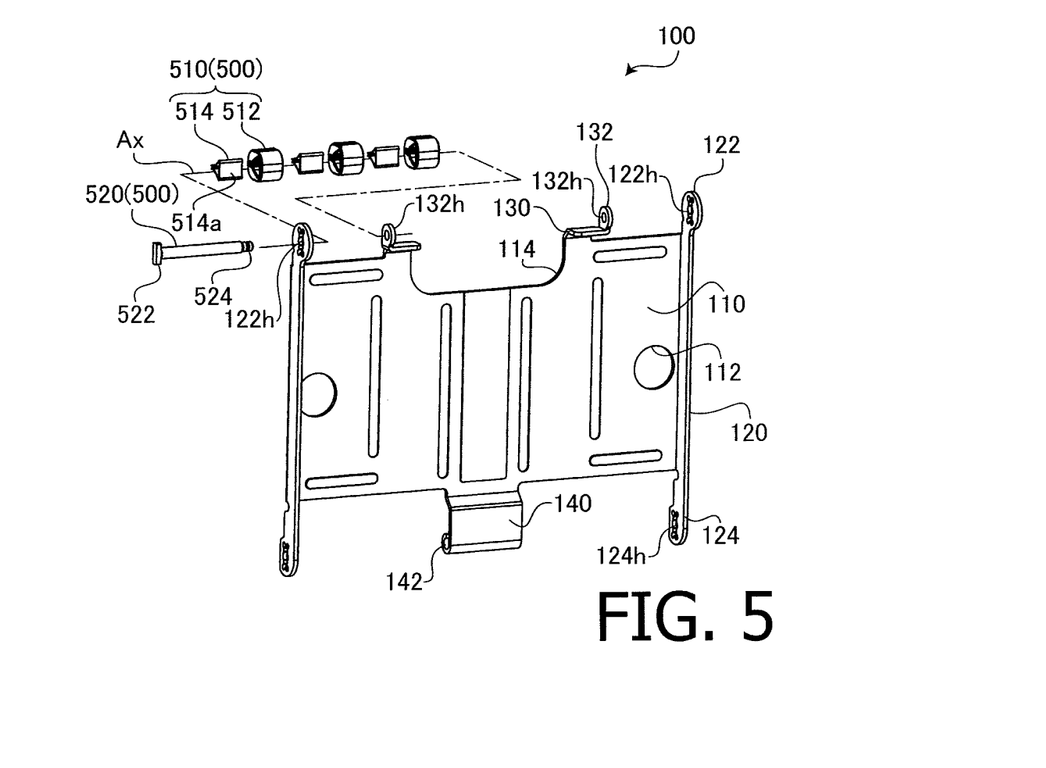
FIG. 5 is an outside drawing of a first movable frame, including an exploded view of a main part of the second hinge unit.

FIG. 5 is an outside drawing of the first movable frame 100 (including an exploded view of a main part of the second hinge unit 500). The back side of the paper face of FIG. 5 corresponds to the camera body 1a side, and the front side of the paper face of FIG. 5 corresponds to the display 30 side. The first movable frame 100 is, for example, a member formed by sheet metal working for a metal plate, such as, a stainless steel plate. As in the case of the exterior cover 20 and the second movable frame 200, a molded product made of magnesium alloy through die casting may be used as the first movable frame 100. The first movable frame 100 has a plate 110 having a rectangular plate-like shape. The plate 110 is folded, at a right angle, toward the display 30 side at both ends in the left and right direction to form a pair of flanges 120.

An upper end part of the flange 120 is formed to protrude upward relative to an upper edge of the plate 110, and is expanded in a circular shape to form a boss 122. At a central part of the boss 122, a boss hole 122h having a non-circular shape (e.g., a rectangular shape) is formed. A lower end of the flange 120 is formed to protrude downward relative to a lower edge of the plate 110 to form an arm 124. In a lower end part of the arm 124, a boss hole 124h having a non-circular shape (e.g., a rectangular shape) is formed.

In a central portion in the left and right direction of the upper edge part of the plate 110, a U-shaped recessed part 114 is formed. At peripheral edge parts of the recessed part 114, a pair of flanges 130 is formed to protrude to the display 30 side from the upper edge part of the plate 110. From an end of the flange 130 in the left and right direction (i.e., an end close to the boss 122), a boss 132 is formed to protrude upward and to expand in a circular shape. In a central part of the boss 132, a boss hole 132h is formed. The boss 132 is disposed to face the boss 122, and the boss hole 132h is formed coaxially with the boss hole 122h (i.e., the boss hole 132h and the boss hole 122h are disposed such that center points thereof are positioned on the same line extending in the left and right direction). As shown in FIG. 5, the two second hinge units 500 are attached to the first movable frame 100 coaxially with each other by the two pairs of boss holes 122h and 132h.

From a central part of the lower edge part of the plate 110 in the left and right direction, a cable guard 140 is formed to extend downward. The cable guard 140 is a structural part to protect a flexible flat cable 12 (see FIG. 11) which electrically connects the display 30 to the camera body 1a. A lower edge part of the cable guard 140 is curved in a cylindrical shape to form a bearing 142. The boss holes 124h of the pair of arms 124 and a hollow part of the bearing 142 are formed coaxially with each other. As shown in FIGS. 4 and 5, the two first hinge units 400 are attached to the first movable frame 100 coaxially with each other by the bearing 142 and the pair of boss holes 124h.

Figure 6:
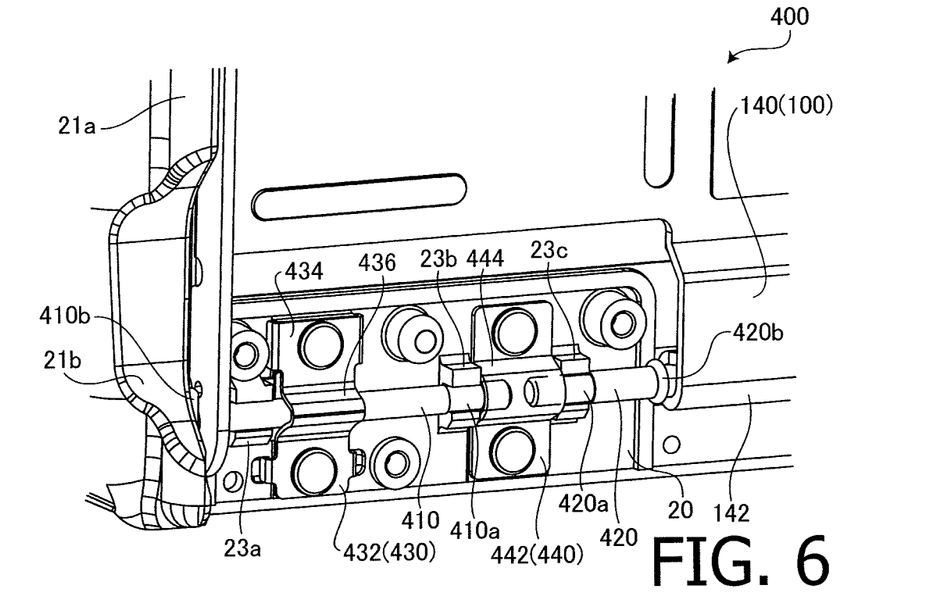
FIG. 6 is an enlarged view around a first hinge unit shown in FIG. 4.

FIG. 6 is an enlarged view around the first hinge unit 400 shown in FIG. 4. The first hinge unit 400 includes metal shaft members 410 and 420, a friction member 430 and a presser member 440. The metal shaft member 420 is used in common by the two first hinge units 400. On the exterior cover 20, a pair of bearings 23a and 23b which rotatably support the metal shaft member 410 and a bearing 23c which rotatably supports the metal shaft member 420 are provided. In each of the bearings 23a, 23b and 23c, a U-shaped groove (or a U-shaped groove having a flat bottom surface) to which the metal shaft member 410 or 420 is fitted is formed. The U-shaped groove is formed such that a curved surface of the bottom part thereof has the same diameter as that of the metal shaft member 410 or 420 and a pair of flat parts facing with each other is formed to have an interval which is slightly narrower than the diameter of the metal shaft member 410 or 420. Therefore, the metal shaft members 410 and 420 are rotatably supported at the bottom part of the U-shaped grooves of the bearings 23a to 23c.

At a position near an end (a right end in FIG. 6) of the metal shaft member 410, a recessed part 410a having a diameter slightly smaller than the other part is formed. The metal shaft member 410 is supported by the bearing 23b at the recessed part 410a. The recessed part 410a is formed to have the same length in the axial direction as that of the bearing 23b. Therefore, the metal shaft member 410 is supported by the bearing 23b without rattling in the axial direction. It should be noted that at a portion where the metal shaft member 410 is supported by the bearing 23a, the recessed part 410a is not formed. The recessed part 410a is formed only at a portion supported by one of the bearings 23a and 23b.

At the other end of the metal shaft member 410, an engagement projection 410b having a non-circular shape corresponding to the shape of the boss hole 124h formed in the arm 124 of the first movable frame 100 is formed. By fitting the engagement projection 410b into the boss hole 124h, the metal shaft member 410 is fixed to the first movable frame 100. Therefore, the first movable frame 100 rotates about the center axis of the metal shaft member 410 together with the metal shaft member 410.

The friction member 430 is a leaf spring member which applies frictional resistance having a predetermined range of strength with respect to rotations of the metal shaft member 410. The friction member 430 includes a pair of plate-like fixing parts 432 and 434 and a friction part 436 which is folded in a V-shape to connect the pair of fixing parts 432 and 434. Each of the pair of fixing parts 432 and 434 has a through hole (not shown) at a central portion thereof, and are fixed to the exterior cover 20 by screws screwed into the respective through holes. The metal shaft member 410 is sandwiched between the V-shaped friction part 436 and the exterior cover 20 (more specifically, an underlay member 450 (which is described later) fixed to the exterior cover 20). The outer diameter of the metal shaft member 410 is larger than an inner diameter (a diameter of an inscribing circle) of a hollow space having a shape of a triangular prism formed between the friction part 436 and the exterior cover 20 when the friction member 430 is attached to the exterior cover 20 without sandwiching the metal shaft member 410 between the friction member 430 and the exterior cover 20. Therefore, the metal shaft member 410 contacts two flat plate parts constituting the V-shaped friction part 436 and the exterior cover 20. Since three frictional surfaces contacting the metal shaft member 410 are secured, a stable frictional force can be obtained. Furthermore, since the metal shaft member 410 is pressed by an appropriate force by the friction part 436 due to an elastic restoring force of the friction member 430, a suitable degree of frictional resistance is applied to rotations of the metal shaft member 410.

The metal shaft member 420 is inserted into the bearing 142 of the first movable frame 100, and the both end parts thereof are supported rotatably by the two bearings 23c of the exterior cover 20, respectively. At the both end parts of the metal shaft member 420, recessed parts 420a are formed to have a diameter slightly smaller than the other part of the metal shaft member 420. The metal shaft member 420 is supported by the bearings 23c at the positions of the recessed parts 420a. The two recessed parts 420a of the metal shaft member 420 are formed to have the same interval as that of the two bearings 23c of the exterior cover 20. Therefore, the metal shaft member 420 is rotatably supported by the two bearings 23c without rattling in the axial direction. Furthermore, on an outer circumferential surface of the metal shaft member 420, a pair of stopper rings 420b is formed at positions close to the both ends of the bearing 142. Therefore, the first movable frame 100 is rotatably supported by the metal shaft member 420 without rattling in the axial direction.

The presser member 440 is a member serving to prevent the metal shaft members 410 and 420 from dropping off from the bearing 23b and 23c, respectively. The presser member 440 includes a pair of plate-like fixing parts 442 and a holding part 444 which is curved in a semicircular shape to connect the pair of fixing parts 442. Each of the pair of fixing parts 7112 has a through hole (not shown) at a central portion thereof, and are fixed to the exterior cover 20, through a washer 25a, by screws screwed into the respective through holes. Since the metal shaft members 410 and 420 are not strongly pressed between the presser member 440 and the exterior cover 20, a large degree of frictional force is not applied to rotations of the metal shaft members 410 and 420. The frictional force produced between the presser member 440 and the metal shaft member 410 and 420 can be adjusted by changing the thickness of the washer 25a.

The strength of the frictional resistance to the rotations of the metal shaft member 410 by the friction member 430 is larger than the strength of the frictional resistance to the rotations to the metal shaft member 410 by the bearings 23a and 23b and the presser member 440, and the frictional resistance to the rotations of the metal shaft member 420 by the bearing 142. Therefore, by changing only the frictional resistance by the friction member 430, the strength of the frictional resistance to the rotations of the first hinge unit 400 can be adjusted. That is, adjustment of the frictional resistance to the rotations of the first hinge unit 400 can be easily performed.

Figure 7:
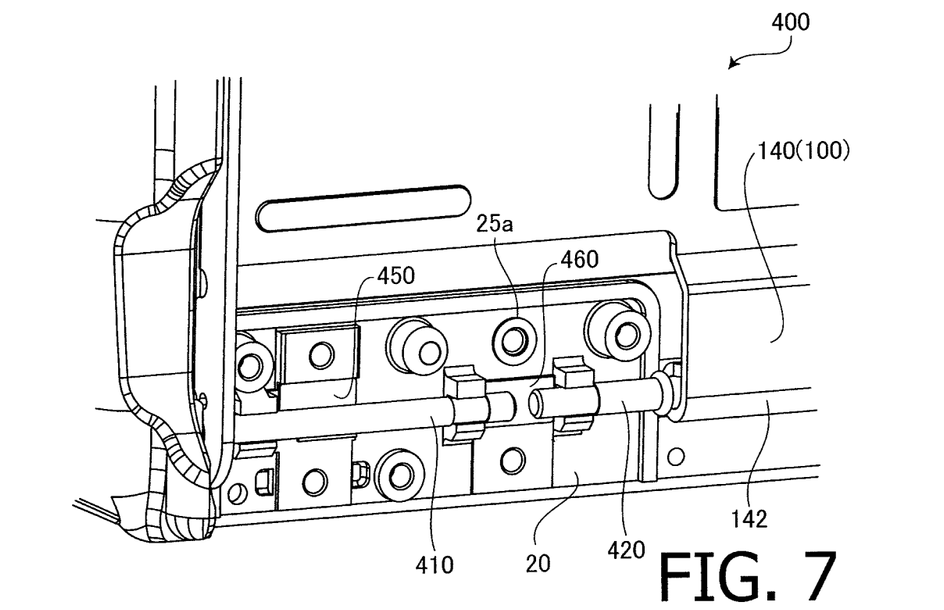
FIG. 7 illustrates a state where a friction member and a presser member are removed from the first hinge unit shown in FIG. 6.

FIG. 7 illustrates a state where the friction member 430 and the presser member 440 are removed from the first hinge unit 400 shown in FIG. 6. As shown in FIG. 7, plate-like underlay members 450 and 460 made of the same material as that of the metal shaft member 410 and 420 (stainless steel in this embodiment) are attached to the exterior cover 20 at portions where the metal shaft members 410 and 420 are sandwiched between the exterior cover 20 and the friction member 430 and the presser member 110, respectively. By providing the underlay members 450 and 460, fluctuations of the frictional force due to electric erosion that could occur when the exterior cover 20 (magnesium alloy) and the metal shaft members 410 and 420 (stainless steel), which are different types of metal, directly contact with each other.

The cable guard 140 is formed to be recessed toward the display 30 with respect to the plate 110. As a result, a space for letting the flexible flat cable 12 freely move is secured between the exterior cover 20 and the cable guard 140. Therefore, it becomes possible to prevent the flexible flat cable 12 from being damaged or deteriorated by excessive bending or deformation.

Figure 8:
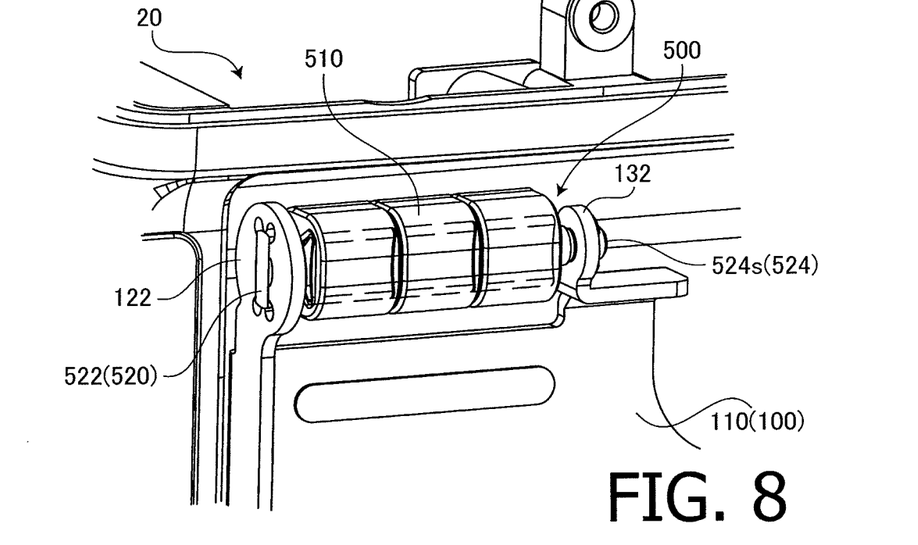
FIG. 8 is an enlarged view around the second hinge unit shown in FIG. 4.
Figure 9:
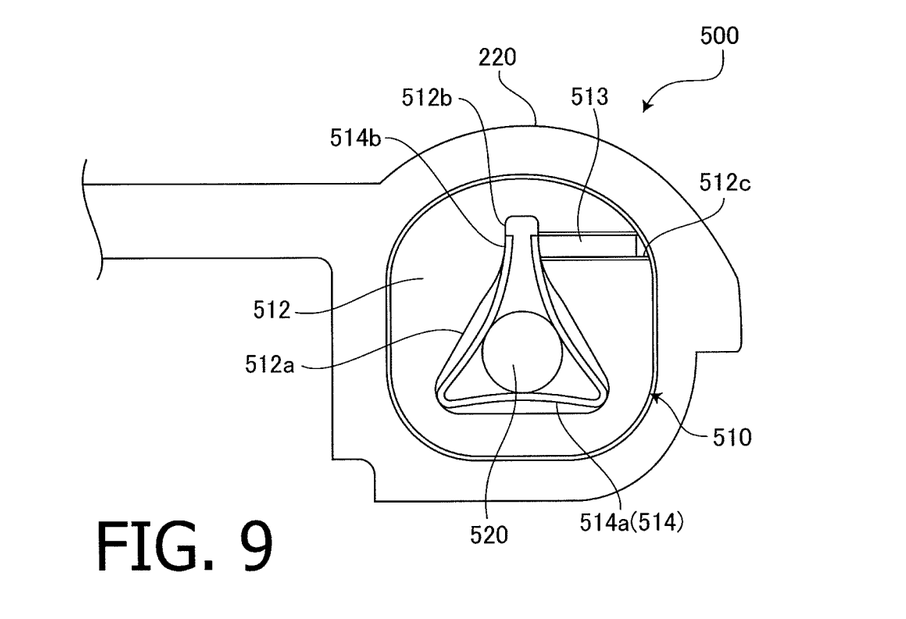
FIG. 9 illustrates a lateral cross section of the second hinge unit.

Hereafter, the second hinge unit 500 is explained. FIG. 8 is an enlarged view around the second hinge unit 500 shown in FIG. 4. FIG. 9 is a lateral cross section of the second hinge unit 500. In FIG. 5, an exploded view of a main part of the second hinge unit 500 is illustrated.

The second hinge unit 500 according to the embodiment includes three bearings 510, a metal shaft member 520 and a bearing holding part 220. It should be noted that the second hinge unit 500 may be configured to include two bearings or to include four or more bearings. By providing a plurality of uniformly configured bearings 510, a stable frictional force can be produced between the bearings 510 and the metal shaft member 520.

In this embodiment, the length of the bearing 510 in the axial direction is set within a range of 3 mm to 4 mm. By setting the length of the bearing 510 in the axial direction in a range of 2 mm to 5 mm (preferably, 3 mm to 4 mm), fluctuation of an inner diameter of a hollow part 512a of a cylindrical body 512 in the axial direction can be suppressed, and therefore a stable frictional force can be produced between the bearing 510 and the metal shaft member 520. The bearing 510 includes the cylindrical body 512 and a friction member 514.

The cylindrical body 512 has an outer circumferential surface whose lateral cross section has a non-circular shape (a rectangular shape whose corner is rounded, in this embodiment), and an inner circumferential surface whose lateral cross section has a non-circular shape (a triangular shape whose corner is rounded, in this embodiment).

The friction member 514 is a leaf spring formed by folding an underlay member, such as a thin stainless steel plate, in a triangular shape having a hollow space, and is accommodated in the hollow part 512a of the cylindrical body 512 without rattling. Each side surface 514a of the friction member 514 having a shape of a triangular prism is moderately curved to protrude toward the metal shaft member 520. Both ends 514b of the friction member 514 in the folding direction (i.e., both ends in an extending direction in FIG. 9) are accommodated in a groove 512b formed at a corner of the hollow part 512a of the cylindrical body 512.

Figure 10:
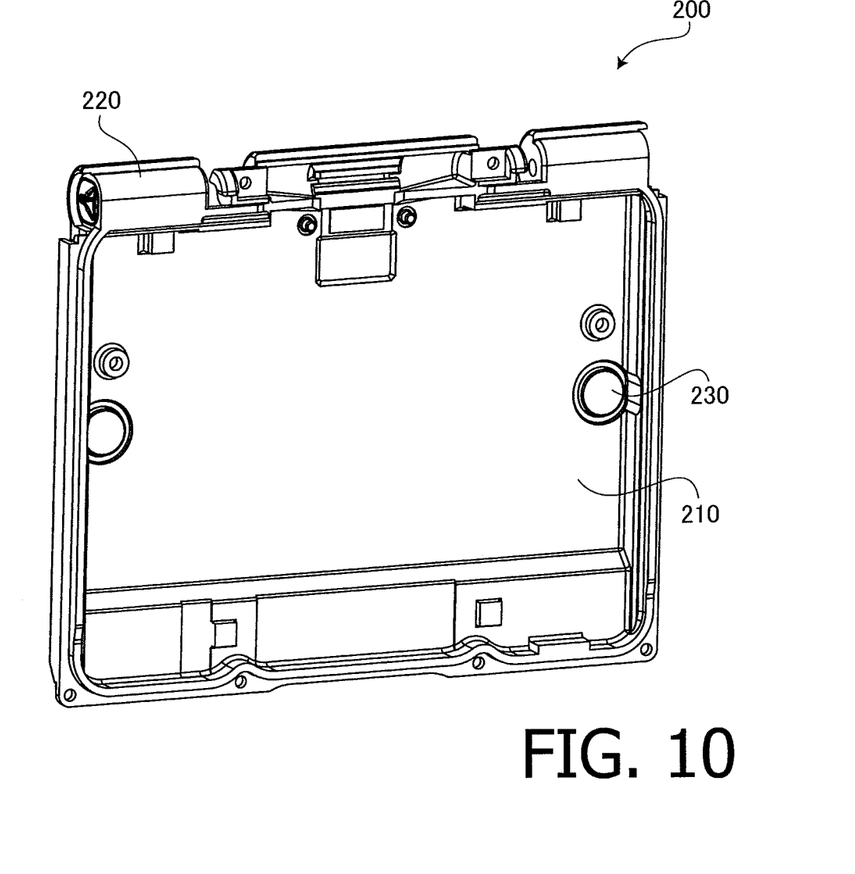
FIG. 10 is an outside drawing of the second movable unit.

FIG. 10 is an outside drawing of the second movable frame 200 (viewed from the camera body 1a side). In order to realize lightness, strength, anti-shock resistance and aesthetics, the second movable frame 200 and the cover 300 are made of magnesium alloy as in the case of the exterior cover 20. As shown in FIG. 10, at the both ends of the upper edge of the second movable frame 200, the pair of cylindrical bearing holding parts 220 is provided. As shown in FIG. 9, an inner surface of the bearing holding part 220 is formed in a non-circular shape (e.g., a shape of a polygonal prism) corresponding to the outer circumferential surface of the cylindrical body 512. The three bearings 510 are fitted into and held by the hollow part of the bearing holding part 220 without rattling.

The metal shaft member 520 is a member having the shape of a slender circular cylinder. At one end of the metal shaft member 520, an engagement projection 522 having the shape of a rectangular solid extending perpendicularly to the center axis of the metal shaft member 520 is formed. At the other end of the metal shaft member 520, a tip part 524 is formed to have a diameter slightly smaller than the other part of the metal shaft member 520. The engagement projection 522 has a shape corresponding to the boss hole 122h of the first movable frame 100, and is fitted into the boss hole 122h. The tip part 524 has a shape corresponding to the boss hole 132h, and is fitted into the boss hole 132h.

The metal shaft member 520 is inserted into the friction member 514 of the bearing 510, and rotatably supports the bearings 510. The outer diameter of the metal shaft member 520 is slightly larger than the inner diameter of the friction member 514. Therefore, when the metal shaft member 520 is inserted into the friction member 514, the friction member 514 is broadened outward by the metal shaft member 520. As a result, by an elastic restoring force of the friction member 514, the metal shaft member 520 is pressed inward in a radial direction by a suitable force, and thereby a suitable frictional force is applied to rotations of the metal shaft member 520. In this embodiment, since the metal shaft member 520 and the friction member 514 are made of the same metal, electric erosion is not caused between the metal shaft member 520 and the friction member 514 and thereby fluctuation of the frictional force by the electric erosion can be prevented. Alternatively, non-metal material, such as fiber reinforced plastic or liquid crustal polymer, may be used for the friction member 514.

In the cylindrical body 512, a screw hole 512c is formed to extend from a position near the inlet of the groove 512b to the outer circumferential surface of the cylindrical body 512. In the screw hole 512c, a stopper screw 513 is screwed. A tip of the stopper screw 513 is protruded into the inside of the groove 512b and presses one end 514b of the friction member 514 toward the other end 514b of the friction member 514, so that the space between the three side surfaces 514a is narrowed. As a result, a pressing force applied to the metal shaft member 520 by the friction member 514 is strengthened and thereby the frictional force applied to the rotations of the metal shaft member 520 is strengthened. By adjusting the protruding amount of the stopper screw 513 into the groove 512b, the strength of the frictional force applied by the friction member 514 to the metal shaft member 520 can be adjusted. In this embodiment, the stopper screw 513 is used only when adjustment of the frictional force is required.

As shown in FIG. 5, the metal shaft member 520 is inserted, from the tip part 524, into the boss hole 122h of the first movable frame 100, and is inserted into the three bearings 510. When the engagement projection 522 of the metal shaft member 520 is thereafter fitted into the boss hole 122h of the first movable frame 100, the tip part 524 is also fitted into the boss hole 132h, and thereby the metal shaft member 520 is fixed to the first movable frame 100. In this case, thanks to engagement between the non-circular engagement projection 522 and the boss hole 122h, the metal shaft member 520 is held in the state of being unable to rotate. It should be noted that, in the boss hole 122h, a clearance for letting a cylinder solid part of the metal shaft member 520 having a larger width than the engagement projection 522 pass therethrough is provided.

The tip part 524 of the metal shaft member 520 has a ring-shaped groove part having the diameter smaller than the boss hole 132h and a stopper ring part 524s which is provided adjacent to the tip side of the ring-shaped groove part and has the diameter slightly larger than the boss hole 132h. By inserting the metal shaft member 520 deep into the boss holes 122h and 132h, the stopper ring part 524s passes through the boss hole 132h, and thereby the boss 132 is fitted into the ring-shaped groove part of the tip part 524. Therefore, the metal shaft member 520 is brought to the state of not dropping off from the first movable frame 100.

The boss hole 122h is formed in the non-circular shape in order to support the metal shaft member 520 such that the metal shaft member 520 is unable to rotate. By forming at least one of the boss hole 122h and the boss hole 132h, both of which support the metal shaft member 520, in the non-circular shape, it becomes possible to prevent the metal shaft member 520 from rotating.

As described above, by providing, as separate members, the bearing holding part 220 and the bearings 510 which are formed using molding dies, it becomes possible to dispose the plurality of bearings 510, having the hollow space size, closely with respect to each other. As a result, it becomes possible to make the frictional force more uniform without increasing the size of the second hinge unit 500. Furthermore, with this configuration, it becomes possible to prevent deformation caused in the bearings 510 from transferring to the bearing holding part 220 (the second movable frame 200) and to prevent deformation caused in the second movable frame 200 from transferring to the bearings 510. As a result, the stability of the operation of the second hinge unit 500 increases. Furthermore, by using the cylindrical body 512 made of resin, deterioration of the performance of the second hinge unit 500 by electric erosion caused between the cylindrical body 512 and the friction member 514 is prevented.

The strength of the rotation resistance of the first hinge unit 400 and the second hinge unit 500 is adjusted to a value close to the lower limit in a range required to stably maintain the position of the display 30 so that the display 30 can be operated by a force as weak as possible. Therefore, the rotation resistance produced by the first hinge unit 400 and the second hinge unit 500 may not be enough to prevent the display 30 from dropping off from the display storing recessed part 21 if a force, such as vibration, which is slightly stronger than the rotation resistance is applied to the display 30, for example, during conveyance. This may cause damage to the display 30. In this respect, the tilt structure 10 according to the embodiment includes a locking mechanism using a magnet so that the display 30 can be securely stored in the display storing recessed part 21, for example, during conveyance.

Hereafter, the locking mechanism according to the embodiment of the invention is explained. As shown in FIG. 10, at both ends in the left and right direction of central portions in the up and down direction on a back surface of a plate 210 of the second movable frame 200, a pair of magnets 230 is attached to protrude from the plate 210.

Furthermore, as shown in FIG. 5, in the plate 110 of the first movable frame 100, a pair of holes 112 are formed at the both ends in the left and right direction of central portions in the up and down direction.

Figure 11:
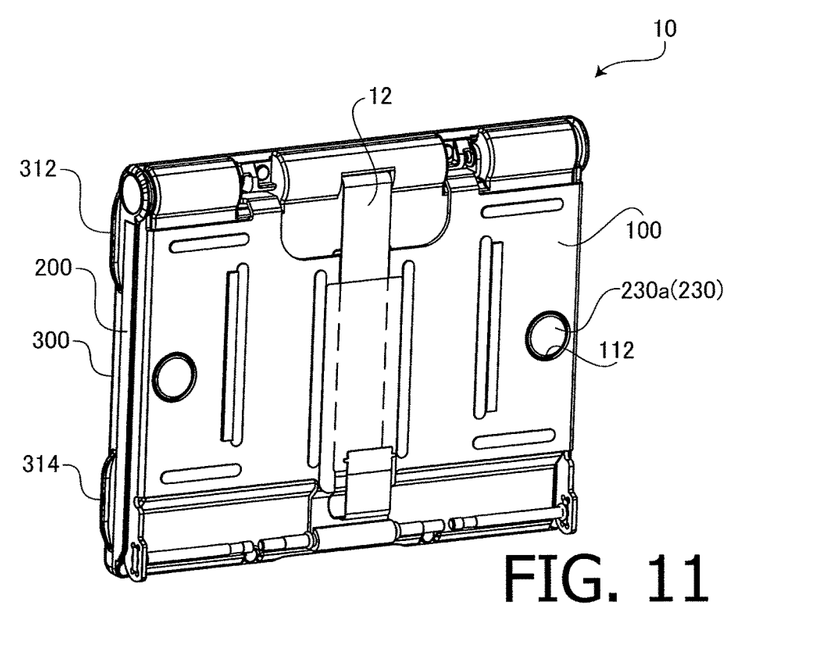
FIG. 11 is an outside drawing of the tilt structure.

FIG. 11 is an outside drawing of the tilt structure 10 viewed from the back side (the camera body side). As shown in FIG. 11, when the second movable frame 200 and the first movable frame 100 are folded, parts of the magnets 230 protruding from the back surface of the plate 210 are stored in the holes 112 of the first movable frame 100. In this case, a top face 230a of the magnet 230 and the back surface (a surface facing the camera body 1a) of the plate 110 of the first movable frame 100 become flush with each other.

Figure 12:
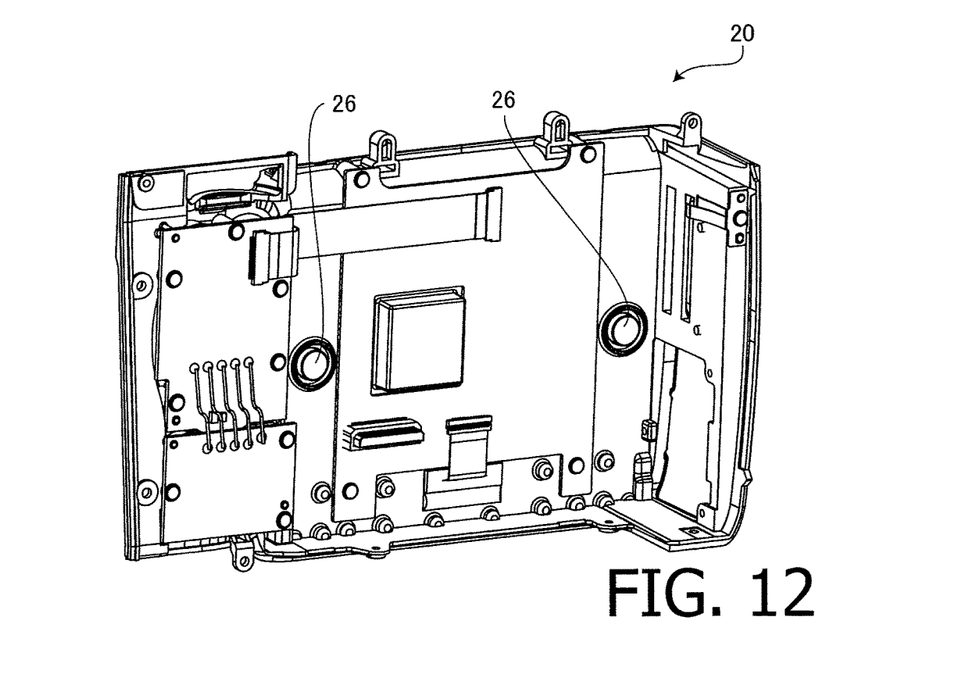
FIG. 12 illustrates a back side of the exterior cover.

FIG. 12 illustrates a back side of the exterior cover 20. On the back side of the exterior cover 20, a pair of magnets 26 is attached at positions facing the pair of magnets 230 attached to the second movable frame 200 when the tilt structure 10 is folded. Therefore, when the tilt structure 10 is folded and brought to the retracted state, the magnets 230 of the second movable frame 200 approach the magnets 26 of the exterior cover 20 and are attracted by the magnets 26. As a result, the second movable frame 200 is brought to the locked state fixed by the magnetic force. In the locked state, the three parts, i.e., the exterior cover 20, the first movable frame 100 and the second movable frame 200, are integrally fixed in a state where these three parts are folded and stacked on top of one another.

Since the locking mechanism according to the embodiment is able to integrally fix the three parts, i.e., the camera body 1a (the exterior cover 20), the first movable frame 100 and the second movable frame 200, at a time by a simple structure formed only by the two pair of magnets 26 and 230, the locking mechanism formed in compact and having suitable operability is realized. Furthermore, by using a magnetic force, the locking mechanism having a high degree of durability and stable performance which lasts for a long period of time can be realized.

In the locked state, the magnet 230 and the magnet 26 do not contact with each other, but approach with respect to each other at a constant distance via the exterior cover 20. Therefore, the locked state cannot be released by an external force applied, for example, during normal conveyance, but can be released relatively easily by a force of a finger. Furthermore, by providing the holes 112 in the first movable frame 100, it becomes possible to let the magnet 230 approach the magnet 26 and thereby to obtain a sufficiently strong magnetic force.

As shown in FIG. 11, two pair of operation nails 312 and 314 are provided for the cover 300 at upper and lower portions on the both side faces of the cover 300 in the left and right direction. Further, as shown in FIG. 3, at a central portion of a lower end face of the cover 300, an operation nail 316 is provided. When a user pulls the cover 300 toward the user (toward the back side of the paper face of FIG. 11) while hooking a finger to the operation nails 312 provided at the position close to the upper edge of the cover 300, the first hinge units 400 are opened and the display 30 is tilted toward the lower side. When the user hooks the finger to the operation nail 314 or 316 provided close to the lower edge of the cover 300 and pulls the cover 300 toward the user, the second hinge units 500 are opened and the display 30 is tilted toward the upper side.

By disposing the magnets 230 and the magnets 26 at the central portion in the up and down direction of the second movable frame 200 and the exterior cover 20, respectively (specifically, a central portion between the first hinge unit 400 and the second hinge unit 500), the torque required to open the first hinge units 400 by operating the operation nails 312 and the torque required to open the second hinge units 500 by operating the operation nails 314 becomes substantially equal to each other. As a result, it becomes possible to release the locked state by a moderate force both in the case of operating the operation nail 312 and the case of operating the operation nail 314. Further, since the positions in the up and down direction of the operation nails 316 and 312 are close to each other, the locked state can be released in all the case of operating the operation nail 312, the case of operating the operation nail 314 and the case of operating the operation nail 316. Therefore, the user does not have an uncomfortable feeling during the operation.

As shown in FIG. 4, at the upper and lower portions of left and right side walls 21a of the display storing recessed part 21 on the exterior cover 20, four recessions 21b for storing the operation nails 312 and 314 are formed. In the retracted state (locked state), the central portions in the up and down direction of the side surfaces of the tilt structure 10 and the display 30 in the left and right direction are covered with the side walls 21a (hereafter, referred to as "guards 21a") formed between the upper and lower recessions 21b, so that the user is not allowed to contact the central portions of the tilt structure 10 and the display 30. Since, in the retracted state, the distance between the portion covered with the guard 21a and the first hinge unit 400 and the second hinge unit 500 is small, a torque required to release the locked state is large. Furthermore, the distance from the portion covered with the guard 21a to the first hinge unit 400 and the distance from the portion covered with the guard 21a to the second hinge unit 500 are substantially the same. Therefore, when the portion covered with the guard 21a is pulled, both of the first hinge unit 400 and the second hinge unit 500 (or an unintended one of the first and second hinge units 400 and 500) may be opened, and thereby an unintended motion of the tilt structure may occur. In this respect, according to the embodiment, by providing the pair of guards 21a, access to the portion where the operability is not so suitable is prevented. As a result, the operability felt by the user can be enhanced.

As shown in FIG. 2, at the upper portion of the left side surface of the exterior cover 20, a memory slot cover 22 which is an openable and closeable cover is provided. When the memory slot cover 22 is opened, a memory card slot mounted on a circuit board (not shown) is exposed, and thereby insertion-extraction of a memory card becomes possible. Further, at a lower left portion on the front surface of the cover 300 shown in FIG. 2, a transparent access lamp window 310 is provided. On the back side of the access lamp window 310, a light emitting device, such as a light emitting diode, is provided. The access lamp window 310 guides visible light emitted from the light emitting device, and emits the light to the outside as scattering light. By switching on the light or blinking the light through the access lamp window 310 during accessing to a memory card, it becomes possible to inform the user of the timing when insertion-extraction of a memory card is not allowed. As a result, occurrence of an accident, such as damage to a memory card or loss of data, can be prevented.

By providing the access lamp window 310 on the cover 300 fixed to the second hinge unit 500 together with the display 30, the access lamp window 310 can be constantly disposed at a position where the user is able to easily visually recognize the access lamp window 310. Therefore, the user is able to securely recognize visually the state (e.g., switching on of light) of the access lamp window 310 together with the display 30. Further, since the access lamp window 310 is disposed at a position close to the memory card slot (the memory slot cover 22) on the cover 300, the user is able to intuitively recognize that the state (e.g., switching on of light) of the access lamp window 310 indicates access to the memory card.

On the front surface of the cover 300, a remote control light-receiving window 320 is provided adjoining to the access lamp window 310. On the back side of the remote control light-receiving window 320, a light-receiving device, such as a photodiode, is disposed. The remote control light-receiving window 320 guides an infrared signal transmitted from an infrared remote controller (not shown) to converge the infrared light signal onto the light-receiving device. By thus providing the remote control light-receiving window 320 on the cover 300 fixed to the second hinge unit 500 together with the display 30, the remote control light-receiving window 320 is constantly disposed to face the user together with the display 30. Therefore, it becomes possible to suitably receive the infrared signal emitted from the infrared remote controller operated by the user.

The foregoing is the explanation about the embodiment of the invention. The invention is not limited to the above described embodiment, but can be varied in various ways within the scope of the invention.

In the above described embodiment, the cylindrical body 512 is a member formed by injection molding using synthetic resin; however, material and a forming manner of the cylindrical body 512 are not limited to the above described embodiment. Since the cylindrical body 512 may be formed as a molded member formed by using a molding die, a member formed by die casting of metal or a member formed by casting or injection molding of ceramics may be used as the cylindrical body 512.

In the above described embodiment, the magnet 26 and the magnet 230 are provided respectively for the exterior cover 20 and the second movable frame 200; however, the present invention is not limited to such a configuration. For example, a magnet may be provided only one of the exterior cover 20 and the second movable frame 200. In this case, the other of the exterior cover 20 and the second movable frame 200 is made of ferromagnetic material, such as metal, which is attracted by the magnet. For example, one of the magnet 26 and the magnet 230 may be replaced with a metal plate being ferromagnetic material. The first movable frame 100 may be provided with a magnet in place of the holes 112. In this case, the exterior cover 20 and the second movable frame 200 are respectively provided with parts made of magnet or ferromagnetic material. In place of having the holes 112, the first movable frame 100 may be configured to have recessions or notches for avoiding interference between the magnet 230 and the first movable frame 100.

In the above described embodiment, the operation nails 312 and 314 are provided on the cover 300; however, the operation nails 312 and 314 may be provided on the second movable frame 200. The operation nail 312 for operation to open the first hinge unit 400 may be provided on the first movable frame 100.

In the above described embodiment, the access lamp window 310 is provided. However, alternative to or in addition to providing the access lamp window 310, an indicator indicating other information regarding the camera 1 (e.g., residual amount of battery, remaining amount of memory, failure, etc.) may be provided on the cover 300 or the second movable frame 200.

In the above described embodiment, the present invention is applied to a support structure for a display of a digital camera; however, the present invention may be applied to another type of camera (e.g., a digital video camera) or another type of electric apparatus having a display (e.g., a television, a video producing device, a game machine, a personal computer, a seat for a transportation equipment such as an aircraft or a train), or may be applied to a movable support structure for a display of a monitor stand. Alternatively, the present invention may be applied to a movable support structure for supporting the position or the orientation of a structural body (e.g., a cover, a mirror, a partition plate, a wind direction board, a fan, a speaker, an illumination device, a projector, a radiating apparatus of radiation) other than a display.

In the above described embodiment, the present invention is applied to an electric apparatus (digital camera) having a driving device for reading/writing of a memory card; however, the present invention may be applied to an electric apparatus having a driving device for driving a removable storage medium (e.g., an optical disc, a removal hard disk drive, a USB memory, a wireless memory card, etc.) other than the memory card.

This application claims priority of Japanese Patent Applications No. P2014-103262, filed on May 19, 2014, and No. P2014-103541, filed on May 19, 2014. The entire subject matter of the applications is incorporated herein by reference.

What is claimed is:

1. An electric apparatus, comprising:
a main body;
a display connected to the main body; and
a support structure comprising:
a base;
a first movable unit rotatably connected to the base;
a first hinge configured to rotatably connect the base and the first movable unit;
a second movable unit rotatably connected to the first movable unit, the body to be supported being attached to the second movable unit;
a second hinge rotatably connecting the first movable unit and the second movable unit, a rotation axis of the second hinge being in parallel with a rotation axis of the first hinge; and
a fixing unit configured to integrally fix the base, the first movable unit and the second movable unit when the base, the first movable unit and the second movable unit are folded and stacked on top of one another, and to release a fixed state of the base, the first movable unit and the second movable unit when a force having a predetermined strength or more is applied to the base, the first movable unit and the second movable unit in a direction to pull the base, the first movable unit and the second movable unit apart,
the support structure movably supporting the display with respect to the main body,
wherein:
the base of the support structure is attached to the main body;
the display is attached to the second movable unit of the support structure; and
the second movable unit of the support structure comprises an indicator disposed in a peripheral portion of a screen of the display.

2. The support structure according to claim 1, wherein the fixing unit integrally fixes the base, the first movable unit and the second movable unit at a central position between the rotation axis of the first hinge and the rotation axis of the second hinge.

3. The support structure according to claim 1, wherein the fixing unit comprises a magnet attached to at least one of the base, the first movable unit and the second movable unit.

4. The support structure according to claim 3,
wherein:
the magnet is attached to one of the base and the second movable unit to protrude toward an other of the base and the second movable unit; and
the first movable unit has one of a hole and a recess in which a protruded part of the magnet is stored.

5. The support structure according to claim 1,
wherein:
the second movable unit comprises a first operator operable to open the second hinge unit; and
the first operator is disposed on a first hinge side with respect to a fixed position by the fixing unit.

6. The support structure according to claim 5,
further comprising a second operator operable to open the first hinge unit,
wherein the second operator is provided on one of the first movable unit and the second movable unit and is disposed on a second hinge side with respect to the fixed position by the fixing unit.

7. The support structure according to claim 1,
wherein the base comprises a guard configured to cover both end portions of each of the first movable unit and the second movable unit in a rotation axis direction, at a central position between the rotation axis of the first movable unit and the rotation axis of the second movable unit, so as to prevent a user's finger from touching both end portions of each of the first movable unit and the second movable unit when the base, the first movable unit and the second movable unit are folded and stacked on top of one another.

8. The support structure according to claim 1,
wherein the first hinge comprises:
a first shaft fixed to the first movable unit;
a bearing fixed to the base, the bearing rotatably supporting the first shaft; and
a friction member fixed to the base, the friction member applying frictional resistance to rotations of the first shaft,
wherein the friction member is a leaf spring comprising:
first and second fixing parts fixed to the base; and
a friction part having a V-shape to connect the first and second fixing parts and to sandwich the first shaft between the friction part and the base,
wherein the first shaft contacts with and is pressed by the base and two surfaces forming the V-shape of the friction part, and the frictional resistance is applied to the rotations of the first shaft.

9. The electric apparatus according to claim 1,
further comprising a driver configured to drive a removable storage medium,
wherein:
the indicator is an access lamp displaying a status of accessing the removable storage medium by the driving device and is disposed on the second movable unit at a position near the driver integrally.

* * * * *